April 1, 1958 A. CAPLAN 2,828,571
HOLDER FOR LIVE BAIT
Filed Nov. 13, 1956
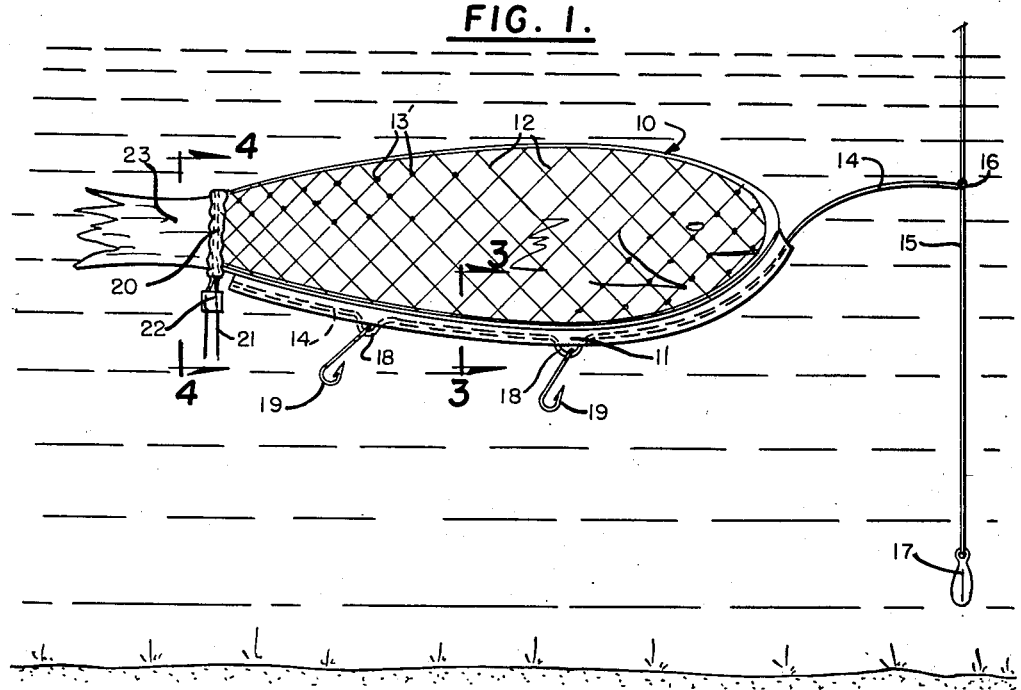
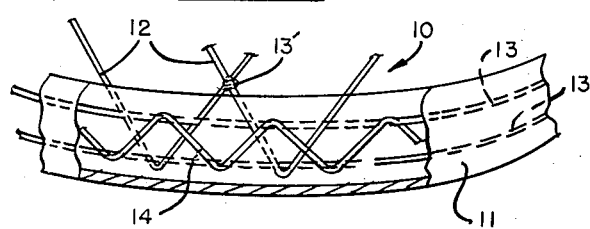
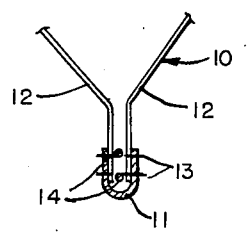
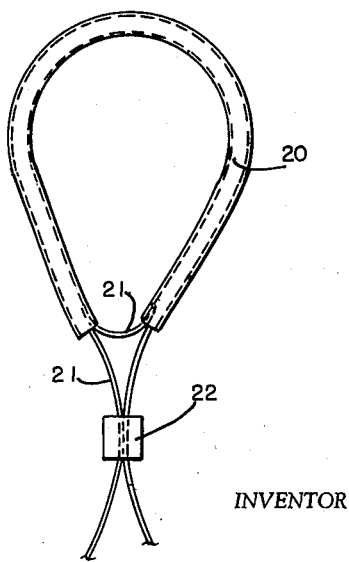
INVENTOR
Alexander Caplan

2,828,571
HOLDER FOR LIVE BAIT

Alexander Caplan, Los Angeles, Calif.

Application November 13, 1956, Serial No. 621,817

3 Claims. (Cl. 43—41)

This invention relates to bait holding devices. More particularly the invention relates to devices employed to hold live bait for the luring of fish.

Various methods have been employed in the past for using a live fish as a lure. In many cases, the method necessitated the attaching of hooks or clips to the fish, with the result that the fish was injured and was rendered useless as a lure. Other methods have included the use of a transparent container, such as plastic, into which the live bait was inserted. Fish hooks were attached to the rigid tube, which in turn was attached by means of a leader to the fishing line. In this case, however, the fish being held in a rigid container were not able to swim freely and in consequence, appeared unnatural, thus destroying its usefulness as a lure.

It is accordingly a principal object of the present invention to provide a holder for live bait wherein the above disadvantages are overcome, means being provided for holding the live bait in such a manner that it can swim freely and is not injured in any way.

It is another object of the present invention to provide a holder for live bait of the above type which will enable a live fish to be used as a lure without injuring it, and which will also allow the fish to swim freely.

Other objects of the invention are to provide a holder for live bait bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which:

Figure 1 is a side elevational view of a preferred embodiment of the present invention shown in operative use;

Fig. 2 is a fragmentary enlarged side elevational view of the reinforcing strip shown partly broken away and in section;

Fig. 3 is a transverse vertical sectional view taken along the line 3—3 of Fig. 1; and Fig. 4 is an end elevational view looking along the line 4—4 of Fig. 1.

Referring now more in detail to the drawing, and in the practice of my invention, 10 indicates generally a substantially tubular shaped sleeve formed from flexible net or thin perforated sheet which may be constructed from a colored, opaque or transparent plastic, such as nylon net. The sleeve 10 includes the soft fabric reinforcing strip 11 of channel-shaped cross section within which the nylon net strands 12 are secured at their lower ends by means of the vertically spaced rows of longitudinally extending stitching 13, substantially as illustrated. The strands 12 are interconnected, as at 13' and form the fish-shaped net 10.

A line 14 is woven about the stitching 13 within the reinforcing strip 11 and extends through the forward end of the strip where it is connected to the fishing line 15 at 16, the fishing line 15 being provided at its lower end with the weight 17. The line 14 extends downwardly through the openings in the central portion of the reinforcing strip 11 in the loop formations 18 to which are connected the fish hooks 19.

The rear end of the net 10 is open and is provided with the fabric tunnel or collar 20, the lower ends of which are open and receive therethrough the draw string 21 having the sliding lock 22 which may also be formed of spring or rubber material.

It will be noted that during the construction of the net 10, the net is cut or the lower edges thereof so drawn together that the sleeve is given a slightly pointed front end adapted to enclose the fish's head. The sleeve need not, of course, be shaped to exactly accommodate a fish over its entire length, but is more effective if so shaped.

A spring clip or elastic band may be employed in place of the fabric tunnel 20 and draw string 21.

In operation, the collar 20 and draw string 21 are loosened to open the rear end of the net to permit the insertion of a fish, head first, into the net. When the fish is correctly positioned with the leader line 14 located on its undersurface, the draw string 21 is tied around the "small" of the fish's tail, as at 23. Thus, the fish is securely held without being injured, and is substantially free to swim, and due to the flexibility and transparency of the net, is entirely natural in appearance.

As will be readily apparent to those skilled in the art, the location of the leader line 14 may be varied, as desired. Similarly, the number or positioning of the fish hooks 19, the manner of fastening, and the method of constructing the sleeve 10 may be varied without departing from the spirit and scope of the invention.

While various changes may be made in the detail construction, it shall be understood that such changes shall be within the spirit and scope of the present invention as defined by the appended claims.

What I claim as new and desire to protect by Letters Patent of the United States is:

1. A flexible holder for live bait comprising a substantially tubular sleeve formed of a flexible material of netlike weave having an open rear end and an open lower portion defined by spaced apart sides, a flexible reinforcing strip of substantially U-shaped cross section receiving said spaced apart sides therewithin, stitching extending longitudinally of said reinforcing strip securing said spaced apart sides to said strip, a leader line within said reinforcing strip interwoven with said stitching and extending forwardly of said sleeve for attachment to a fishing line, means for constricting the rear open end of said sleeve, a plurality of fish hooks, and means for connecting said fish hooks to said sleeve.

2. A flexible holder for live bait according to claim 1, said means for connecting said fish hooks to said sleeve comprising said leader line extending downwardly through a central portion of the reinforcing strip in loop formations longitudinally spaced apart, the fish hooks being connected to said loop formations.

3. A flexible holder for live bait according to claim 2, said constricting means comprising a flexible tunnel having open ends and secured to the rear end of said sleeve, a draw string extending within said tunnel and outwardly through the open ends thereof and means for retaining said draw string in a tightened position, said last mentioned means being releasable to permit insertion and removal of a fish.

References Cited in the file of this patent

UNITED STATES PATENTS

| | | |
|---|---|---|
| 862,150 | Fredricks | Aug. 6, 1907 |
| 2,476,553 | L'Huillier | July 19, 1949 |